US006590503B1

(12) United States Patent
Elliott

(10) Patent No.: US 6,590,503 B1
(45) Date of Patent: Jul. 8, 2003

(54) REMOTE CONTROL SYSTEM

(75) Inventor: Scott Elliott, Federal Way, WA (US)

(73) Assignee: Nintendo of America Inc., Redmond, WA (US)

( * ) Notice: Subject to any disclaimer, the term of this patent is extended or adjusted under 35 U.S.C. 154(b) by 0 days.

(21) Appl. No.: 09/515,865

(22) Filed: Feb. 29, 2000

Related U.S. Application Data

(60) Provisional application No. 60/178,708, filed on Jan. 28, 2000.

(51) Int. Cl.[7] ........................ G08C 19/00; G05B 19/00; G06F 7/00; G08B 29/00; H04B 29/00

(52) U.S. Cl. .................................. 340/825.69; 340/5.64

(58) Field of Search ....................... 340/825.69, 825.72, 340/10.52, 825.22, 825.29, 5.64

(56) References Cited

U.S. PATENT DOCUMENTS 5,329,370 A * 7/1994 Yazolino et al. ............ 548/734
5,410,326 A * 4/1995 Goldstein ................... 348/134
5,523,800 A * 6/1996 Dudek ......................... 348/734
5,614,906 A * 3/1997 Hayes et al. ................ 341/176
5,889,506 A * 3/1999 Lopresti et al. ............. 345/158
5,959,751 A * 9/1999 Darbee et al. .............. 359/148
6,157,319 A * 12/2000 Johns et al. ........... 340/825.72
6,198,408 B1 * 3/2001 Cohen ................... 340/825.69
6,236,350 B1 * 5/2001 Andrews .................... 341/176

* cited by examiner

*Primary Examiner*—Michael Horabik
*Assistant Examiner*—Nam Nguyen
(74) *Attorney, Agent, or Firm*—Nixon & Vanderhye, P.C.

(57) ABSTRACT

A remote control system includes a memory storing a code library. A control circuit retrieves codes from the code library and supplied the codes to logic circuitry. The logic circuitry generates signals usable to control a transmitter.

17 Claims, 4 Drawing Sheets

Fig. 3A MODULATED

Fig. 3B DEMODULATED

| Bit 7 | Bits 6-0 |
|---|---|
| Logical value of event (1=modulate, 0=off) | Length of event (in Modulation Periods) |

Fig. 5A

| Command | OpCode | Address | Block Count | Data Xfer | Description |
|---|---|---|---|---|---|
| Send IR | 50h | Modulation Period uS (0,10 to 511) | Number of Events to be sent | Y | Valid values for the modulation period are 10 to 511 and 0. If the value is 0 the clock output of the pre-scaler is 1 kHz, but the output is not modulated. Number of events is the total number of bytes (events) that will be sent via DMA. MSb of each event sent is the logical value of that event. |

Fig. 5B

REMOTE CONTROL SYSTEM

CROSS-REFERENCE TO RELATED APPLICATION

This application claims priority from provisional application No. 60/178,708, filed Jan. 28, 2000, the contents of which are incorporated herein in their entirety.

BACKGROUND AND SUMMARY OF THE INVENTION

The present invention generally relates to a remote control system and, more particularly, to a remote control system for remotely controlling devices such as appliances, entertainment equipment, and heating/cooling equipment.

Wireless remote controls for controlling appliances, entertainment equipment, heating/cooling equipment and even the firmness of a bed are well-known. In one implementation, a hand-held infrared remote control generates infrared signals based on user inputs. For example, in the case of a hand-held remote control for controlling a television, the user may press a POWER button on the remote control. A control circuit of the hand-held remote control processes this user input and generates an infrared signal by, for example, accessing a memory to retrieve a code corresponding to the user input and then using the retrieved code to generate and transmit the infrared signal. The television has an infrared receiver that receives the infrared signal. A control circuit of the television is responsive to the received infrared signal to “power on” the television. Similar operations occur when the user presses buttons on the remote control for changing channels, increasing/decreasing volume, etc.

Manufacturers often provide remote controls for particular devices to consumers. A problem arises in that consumers can quickly accumulate a large number of different remote controls, each of which controls only one particular device. A solution to this problem is provided by so-called “universal” remote controls that are usable to control a number of different devices. For example, a single universal remote control may be used to control a television, a video recorder/player, and stereo equipment. Generally speaking, these universal remote controls include a memory that has a library of codes for different devices. The consumer configures the remote control so that codes in the memory that are appropriate to the particular makes and models of the devices owned by the consumer are accessed and used to generate the signals for controlling these devices.

To perform certain desirable operations, the control of various devices must be coordinated. For example, to record a television program, a set-top box must be tuned to a particular channel at (or slightly before) the program start time and a video recording device (e.g., a video cassette recorder) must be turned on at (or slightly before) the program start time, controlled to begin a recording operation, and controlled to end the recording operation at the program end time. In order to simplify this operation for users, some set-top boxes are provided with remote control circuitry for remotely controlling a video recording device. These set-top boxes may be provided with an interface that permits users to select future programs for recording. Such an interface is described, for example, in U.S. Pat. No. 5,479,268, the contents of which are incorporated herein. Using information about the future programs (e.g., start time, end time, channel), the set-top box tunes itself to the channel carrying the program at (or slightly before) the start time of a program selected for recording. The set-top box also generates remote control signals for turning on the video recording device and for initiating the recording operation. When the program ends, the set-top box generates remote control commands for ending the recording operation and for turning off the video recording device.

In some instances, the remote control circuitry of the set-top box comprises a controller (e.g., an 8-bit controller) that is separate from, but responsive to, a main microprocessor that controls the overall functionality of the set-top box. FIG. 1 shows an arrangement including a main microprocessor 8, controller 10, a memory 12, an input device 14, and light-emitting diodes (LEDs) 18. In response to instructions from main microprocessor 8 for switching on a video recording device, for example, controller 10 accesses appropriate codes from memory 12. These codes are used to control the on/off switching of LEDs 18 to thereby generate an infrared signal for switching on the video recording device. Input device 14 such as a keypad is operable by a user to input commands including, but not limited to, commands for the remote control of other devices via the remote control circuitry. Input device 14 may even be an infrared receiver for receiving user commands from a hand-held remote control. While this arrangement works quite effectively, the requirement of a controller that is separate from the main microprocessor tends increase the cost of the set-top box.

In other instances, the main microprocessor is itself configured to generate the infrared remote control signals. That is, the main microprocessor accesses appropriate codes from a memory, and uses the accessed codes to drive the LEDs. This arrangement also works quite effectively and does not require a separate controller for the remote control circuitry. However, it requires that the main microprocessor have processing power sufficient to perform remote control operations, while at the same time performing other set-top box functions such as memory accesses, video transfer, decryption, modem communications, and the like. Since the generation of infrared control signals involves a large number of interrupts to a microprocessor, the efficiency at which the microprocessor performs its other functions can be reduced, particularly if low-cost microprocessors having relatively low processing power are used.

In order to avoid these and other disadvantages of the prior art system described above, the remote control system described herein uses simple logic circuitry to drive the remote control transmitter. This logic circuitry is a very low cost alternative to using a separate controller dedicated to remote control operations. In addition, the logic circuitry is designed to minimize the interruptions to a microprocessor so that the microprocessor may efficiently perform its other functions.

These and many other advantages of the present invention will be more completely understood and appreciated by careful study of the following more detailed description of illustrative embodiments of the invention taken in conjunction with the accompanying drawings.

BRIEF DESCRIPTION OF THE DRAWINGS

FIGS. 5A shows the format of an event byte and FIG. 5B shows the format of a SendIR command.

DETAILED DESCRIPTION

Figure 1:
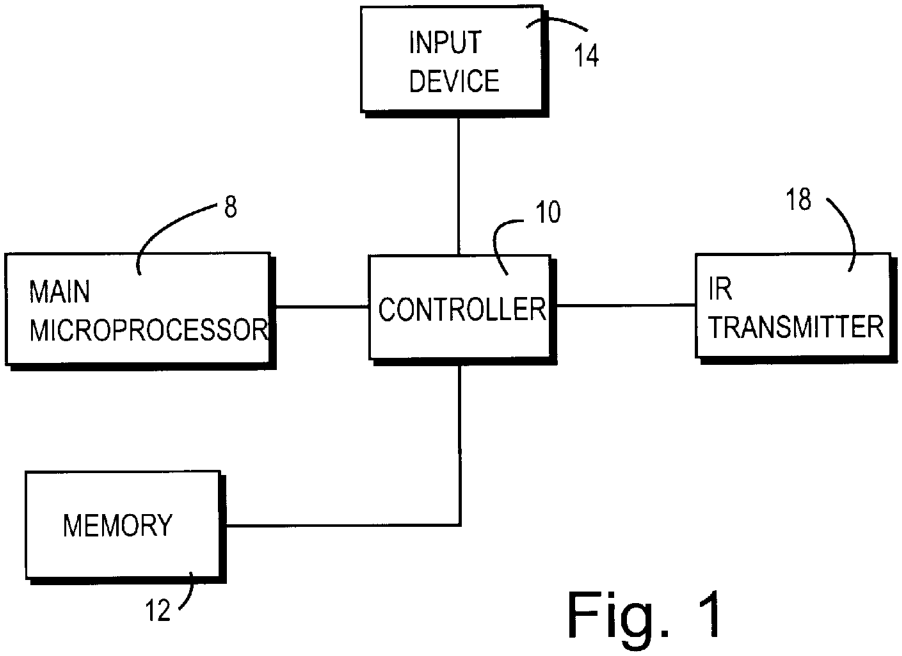
Fig. 1 (PRIOR ART)
FIG. 1 is a block diagram of one conventional arrangement for a remote control system.
Figure 2:
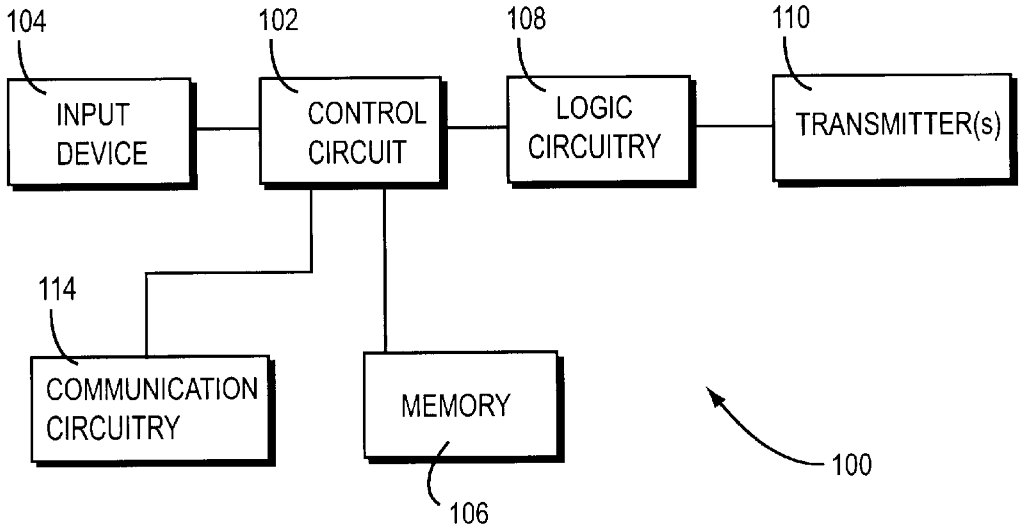
FIG. 2 is a block diagram illustrating a remote control system in accordance with the present invention.

FIG. 2 is a block diagram illustrating a remote control system 100 in accordance with the present invention. Remote control system 100 includes a control circuit 102 (such as a microprocessor), an input device 104, a memory 106, logic circuitry 108 and one or more light-emitting diodes (transmitters) 110. As will be explained in greater detail below, communication circuitry 114 may be provided in some implementations. It is contemplated that the remote control system described herein may be incorporated in just about any device that remotely controls one or more other devices via a wireless (e.g., infrared) link.

Memory 106 of remote control system 100 stores a library of codes usable for generating infrared signals that are recognizable by various other devices. The codes are stored in memory 106 in a format suitable for supply to logic circuitry 108. In some cases, the infrared signals communicate control data for controlling the devices (e.g., on/off switching, channel changing, volume control, etc.). In other cases, the infrared signals may communicate text, image or audio data to the devices. The contents of the code library are determined by the desired functionality of the remote control system. For example, if the remote control circuitry is to be incorporated in a set-top box for a cable television system, the code library may contain codes usable to generate infrared signals for controlling one or more devices such as television sets, video recording/playback devices, audio equipment, computer equipment, game consoles, portable (hand-held) game machines, camcorders, etc. The code library may also contain codes for generating infrared signals usable to transmit text, audio, and/or image data for output, for example, via a display of a hand-held remote control, or a display and/or speaker(s) of a portable game machine such as the Nintendo® GameBoy®.

The contents of the code library may be pre-programmed in memory 106. Alternatively or additionally, some or all of the contents of the code library may be downloaded to memory 106 via communication circuitry 114. For example, if the remote control system is incorporated in a set-top box of a cable television system, some or all of the contents of the code library may be downloaded via in-band and/or out-of-band communications channels of the cable television system. In this case, communication circuitry 114 may comprise in-band and/or out-of-band data receivers. If the remote control system is incorporated in a device configured to access the World Wide Web, some or all of the contents of the code library may be downloaded by accessing a particular web site and selecting codes that are appropriate for the device or for the desired functionality of the device. In this case, communication circuitry 114 may comprise a modem. Still further, some or all of the contents of the code library may be obtained from a memory cartridge that is, in use, attached to a device incorporating the remote control system. In this case, communication circuitry 114 may comprise a memory cartridge reader. Control circuit 102 may directly access the codes contained in a memory cartridge when the memory cartridge is electrically connected to control circuit 102 via the memory cartridge reader. Alternatively, the codes contained in a memory cartridge may be selectively loaded into memory 106 for subsequent access by control circuit 102.

Input device 104 is operable by a user to input commands for processing by control circuit 102. These commands may include, but are not limited to, commands for controlling a television, a video recording/playback device etc. Input device 104 may be a keypad, a mouse, a joystick, a game controller, a keyboard and the like. Input device 104 may also be a remote control receiver for receiving signals from a user-operated remote control transmitter.

In response to user inputs via input device 104 or as a result of other operations involving control circuit 102 (e.g., control circuit 102 determines that the current time corresponds to the start time of a program selected by a user for recording), control circuit 102 accesses appropriate code(s) from the code library stored in memory 106. As will be explained in greater detail below, control circuit 102 supplies the accessed code(s) to logic circuitry 108. Based on these codes, logic circuitry 108 generates signals for controlling the on/off switching of the one or more LEDs 110.

Figure 3:
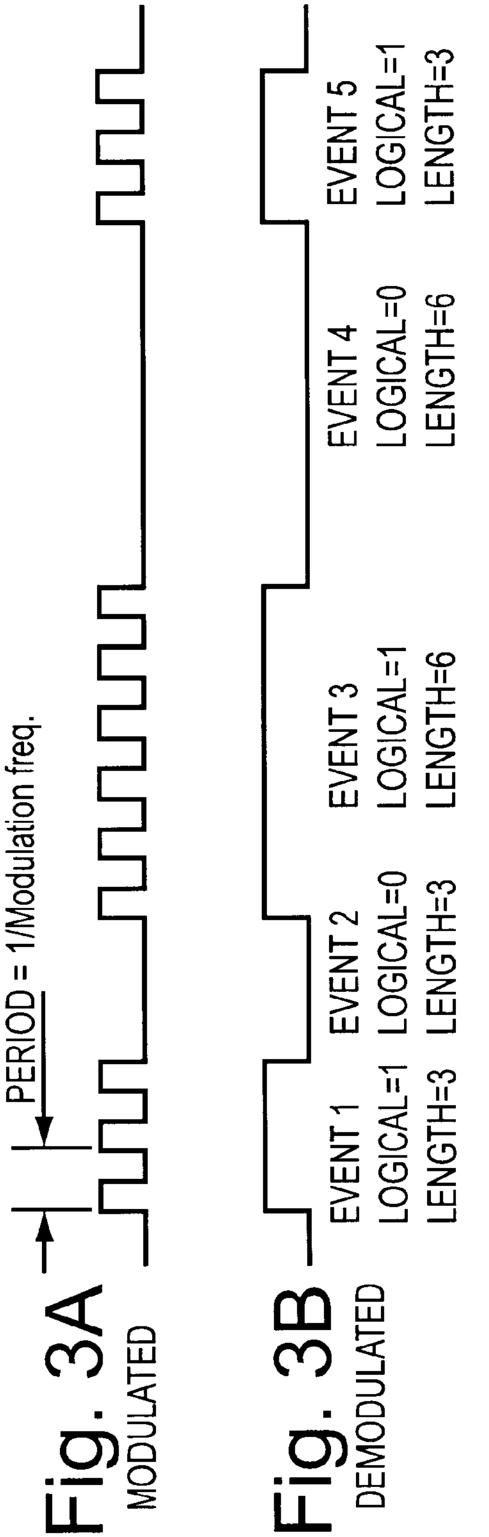
FIG. 3A shows an example the modulated output signal of logic circuitry 108 and FIG. 3B shows the result of demodulating the signal of FIG. 3A.

FIG. 3A shows an example the modulated output signal of logic circuitry 108. As shown in FIG. 3A, the output signal comprises a series of "events", each event having an event logic level (i.e., "0" or "1") and an event duration (in modulation periods). For example, event 1 is a logic "1" event having a length of 3 modulation periods; event 2 is a logic "0" event having a length of 3 modulation periods; event 3 is logic "1" event having a length of 6 modulation periods; and event 4 is a logic "0" event having a length of 6 modulation periods. FIG. 3B shows the result of demodulating the signal shown in FIG. 3A. By providing appropriate event logic levels, event lengths and numbers of events, signals recognizable by a wide variety of devices configured with wireless receivers may be generated.

Figure 4:
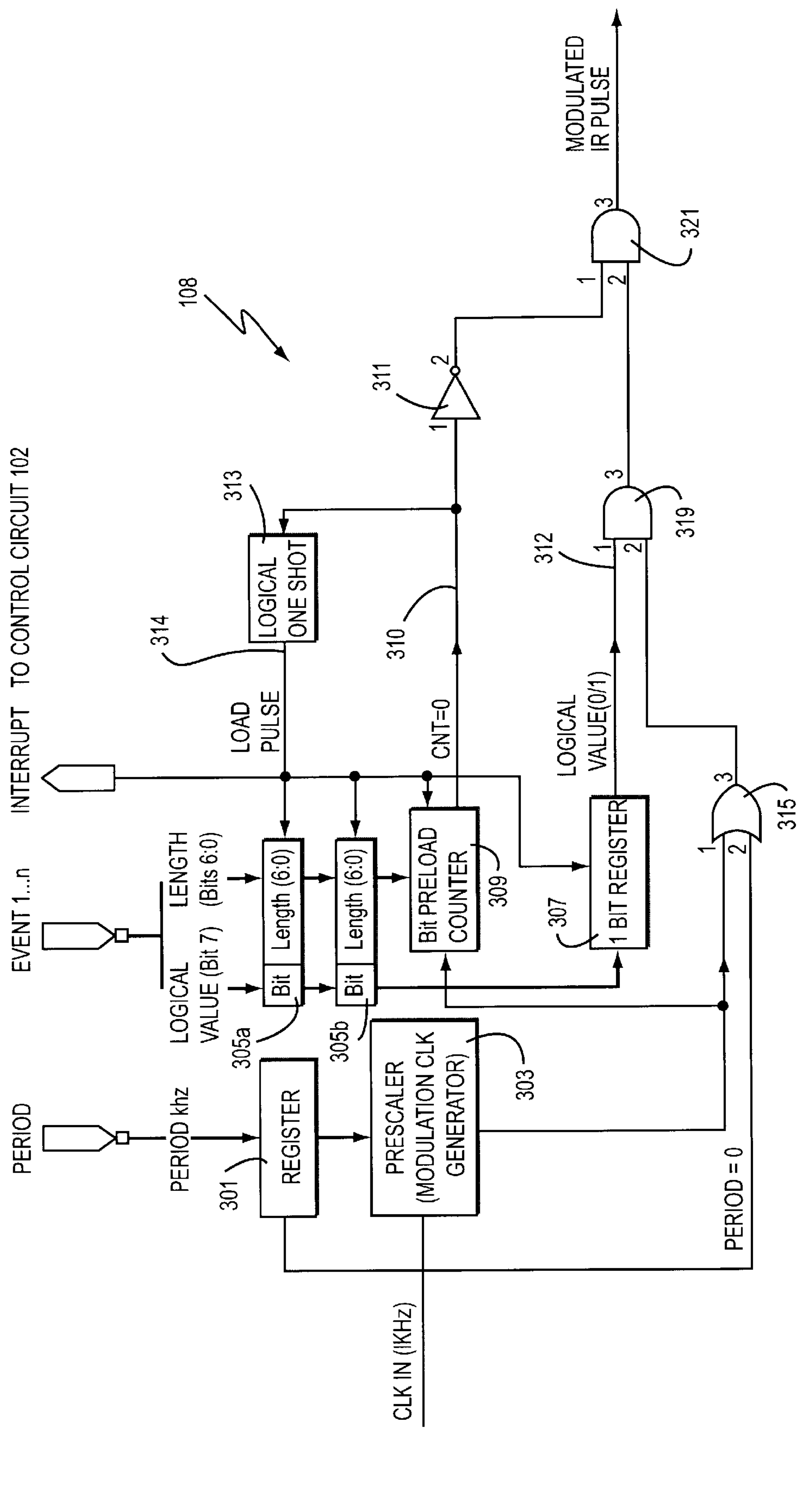
FIG. 4 shows a logical equivalent diagram of logic circuitry 108.

FIG. 4 shows a logical equivalent diagram of logic circuitry 108. Logic circuitry 108 includes a register 301 that is loaded with data indicative of the modulation period. (FIG. 3A shows the modulation period.) In the implementation described with reference to FIG. 4, the modulation period may be 0 or be in a range between 10 and 511 microseconds. Modulation clock generator 303 is supplied with a raw clock signal (e.g., 1 kHz) and generates a local clock signal from this raw clock signal based upon the modulation period stored in register 301.

Double buffered registers **305*a*, 305*b* are loaded with an "event byte" having the format shown in FIG. 5A. Bit 7 of the event byte indicates the logical value of the event (1=modulate, 0=off). Bits 0–6 of the event byte indicate the length of the event in modulation periods. Bit 7 of the event byte is loaded into 1-bit register 307 and a count corresponding to bits 0–6 of the event byte is loaded into a counter 309. A signal line 312 is connected to 1-bit register 307. Counter 309 counts down from the count loaded therein at a rate determined by the local clock signal output by clock generator 303. A signal line 310 connects an output of counter 309 to an input of an inverter 311 and to an input of a logical one shot 313. A signal line 314 connects the output of logical one shot to control circuit 102, to registers 305*a*, 305*b*, to 1-bit register 307, and to counter 309**.

The output of clock generator 303 is supplied to counter 309 and to a first input of an OR gate 315. The second input of OR gate 315 is connected to signal line 317. The signal on signal line 317 is determined by the contents of register 301. If register 301 is loaded with data indicative of a modulation period of 0, the signal on signal line 317 is high. Otherwise, the signal on signal line 317 is low.

The output of OR gate 315 is supplied to a second input of AND gate 319. The first input of AND gate 319 is connected to signal line 312. The output of AND gate 319 is supplied to a second input of AND gate 321. The first input of AND gate 321 is connected to the output of inverter 311. The output of AND gate 321 is a modulated signal like the signal shown in FIG. 3A for controlling the on/off switching of the one or more LEDs 110.

The sending of an infrared signal is based on a SendIR command processed by control circuit 102. The SendIR command may have the format shown in FIG. 5B. The SendIR command designates the modulation period which, as discussed above, can be 0 or be in a range from 10 to 511 microseconds. The command also designates the number of events to be sent, each of these events being determined in accordance with the event byte shown in FIG. 5A. The most significant bit of each event byte is the logical value of that event and the remaining bits designate the length of the event (in modulation periods). The total number of events may be up to 8191 ($2^{13}-1$).

In operation, register 301 is loaded with data indicative of the modulation period as designated in the SendIR command shown in FIG. 5B and registers 305*a*, 305*b* are loaded with the first event byte. Modulation clock generator 303 generates a local clock signal based on the modulation period stored in register 301. This local clock signal is provided to the first input of OR gate 315. When the modulation period stored in register 301 is 0, the local clock signal is a 1 kHz signal.

The signal on signal line 317 is applied to the second input of OR gate 315. This signal is determined by the modulation period stored in register 301. If register 301 is loaded with data indicative of a modulation period of 0, the signal on signal line 317 is high. Otherwise, the signal on signal line 317 is low. In this way, OR gate 315 passes the local clock signal to the second input of AND gate 319 only if the modulation period is not 0. The first input to AND gate 319 is connected to signal line 312. The signal level on signal line 312 is determined by the contents of 1-bit register 307, i.e., by the most significant bit of the event byte. If the most significant bit of the first event byte is “1”, a high level signal is supplied to signal line 312. If the most significant bit of the first event byte is “0”, a low level signal is supplied to signal line 312. Thus, the local clock signal is supplied to the second input of AND gate 321 only if the most significant bit of the first event byte is “1”.

Counter 309 counts down in accordance with the local clock signal output by clock generator 303. While counter 309 is counting (i.e., while the counter contains a non-zero count), a low-level signal is present on signal line 310. This low-level signal is inverted by inverter 311 and supplied as a high-level signal to the first input of AND gate 321. Thus, while the counter is counting, the output of AND gate 321 is determined by the signal at the second input thereof. If the local clock signal is supplied to this second input while the counter is counting (because bit 7 of the event byte is “1”), the local clock signal will be output from AND gate 321. This output is a logical “1” output comprising pulses whose number is determined by the number of modulation periods designated by bits 0–6 of the event byte and whose period is determined in accordance with the modulation period loaded into register 301. If a low level signal is supplied to the second input of AND gate 321 while the counter is counting, this low level signal is output from AND gate 321. This output is a logical “0” output, duration of which is determined by the count in counter 309.

When the counter stops counting (i.e., reaches 0), a high-level signal is output on line 310. This signal is supplied to logical one-shot 313 and logical one-shot generates a load pulse signal in response thereto. This load pulse signal is supplied as an interrupt to control circuit 102. Control circuit 102 then supplies the second event byte to be loaded into double buffered registers 305*a*, 305*b* and the above-operation is repeated until the counter stops counting and a third event byte is loaded into double buffered registers 305*a*, 305*b*. This process continues until the last event byte is reached as determined by the “block count” in the SendIR command.

The particular arrangement of components shown in FIG. 4 is provided by way of illustration, not limitation. It will be readily apparent that other arrangements of logic circuits, registers, counters, etc. may be utilized within the spirit and scope of the present invention.

The output of logic circuitry 108 is used to control the on/off switching of the one or more LEDs 110. This output may be used, for example, to control multiple devices. For example, the output may control both a cable box and a VCR at the same time. Two IR LEDs (“bugs”) may be placed on a single Y-type cable. One IR LED could be placed next to the VCR, the other next to the cable box. The signals generated by the remote control circuitry 100 causes both LEDs to flash at the same time with the same signal. The cable box sees transmissions intended for the VCR, and the VCR sees transmissions intended for the cable box, but since each device is programmed to respond only to its own unique set of signals, one device will ignore the signals intended for the other device. In this way, two devices may be controlled with the same signal output.

As discussed above, the remote control system described herein uses simple logic circuitry to drive a remote control transmitter. This logic circuitry is a very low cost alternative to using a separate controller dedicated to remote control operations. In addition, the logic circuitry is designed to minimize the interruptions to a microprocessor (or other control circuit) so that the microprocessor (or other control circuit) may efficiently perform its other functions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A remote control system comprising:

a memory for storing a code library;

a control circuit configured to retrieve codes from said code library;

logic circuitry responsive to said control circuit to generate signals based on the retrieved codes; and a transmitter for transmitting signals to a remote device bused on the signals generated by said logic circuitry, wherein said logic circuitry is supplied with modulation period data and event data for one or more events, the event data comprising an event value and an event length for each event, and wherein said logic circuitry comprises:

a first logic circuit for logically combining a clock signal obtained from the modulation period data and an event value signal obtained from the event value; and a second logic circuit for logically combining an output signal of the first logic circuit and an event length signal obtained from the event length.

2. The remote control system according to claim 1, further comprising an input device, said control circuit being responsive to inputs via said input device to retrieve codes from said code library.

3. The remote control system according to claim 1, wherein said transmitter comprises an infrared transmitter.

4. The remote control system according to claim 1, wherein at least some of the codes of the code library are pre-programmed into said memory.

5. The remote control system according to claim 1, wherein at least some of the codes of the code library are downloaded into said memory.

6. The remote control system according to claim 1, wherein the transmitted signals comprise control signals for controlling said remote device.

7. The remote control system according to claim 1, wherein the transmitted signals comprise one or more of text, audio and image data signals.

8. The remote control system according to claim 1, wherein said transmitter is a wireless transmitter.

9. The remote control system according to claim 1, wherein the logic circuitry further comprises:

a third logic circuit for passing the clock signal to the first logic circuit only if the modulation period data corresponds to a non-zero modulation period.

10. The remote control system according to claim 1, wherein the logic circuitry further comprises:

a circuit for supplying an interrupt to the control circuit at the end of an event as determined by the event length.

11. The remote control system according to claim 10, wherein said control circuit supplies an event value and an event length for another event to said logic circuitry in response to the interrupt.

12. The remote control system according to claim 1, wherein the event value is a logic level value.

13. The remote control system according to claim 1, wherein the event value signal is the output of a register loaded with the event value.

14. The remote control system according to claim 1, wherein the event length signal is derived from the output of a counter loaded in accordance with the event length.

15. The remote control system according to claim 14, wherein the counter counts in accordance with the clock signal.

16. The remote control system according to claim 14, wherein the logic circuitry further comprises:

a circuit for supplying an interrupt to the control circuit when the count of the counter reaches a predetermined value indicative of the end of an event.

17. The remote control system according to claim 16, wherein said control circuit supplies an event value and an event length for another event to said logic circuitry in response to the interrupt.

* * * * *